(12) United States Patent
Badding et al.

(10) Patent No.: US 6,630,267 B2
(45) Date of Patent: Oct. 7, 2003

(54) SOLID OXIDE FUEL CELLS WITH SYMMETRIC COMPOSITE ELECTRODES

(75) Inventors: Michael E. Badding, Elmira, NY (US); Jacqueline L. Brown, Lindley, NY (US); Thomas D. Ketcham, Big Flats, NY (US); Dell J. St. Julien, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 193 days.

(21) Appl. No.: 09/858,125

(22) Filed: May 15, 2001

(65) Prior Publication Data

US 2001/0044043 A1 Nov. 22, 2001

Related U.S. Application Data

(60) Provisional application No. 60/205,353, filed on May 18, 2000.

(51) Int. Cl.[7] .............................. H01M 4/86; H01M 8/12
(52) U.S. Cl. ................ 429/40; 429/30; 429/44
(58) Field of Search ........................ 429/30, 33, 40, 429/41, 44, 45

(56) References Cited

U.S. PATENT DOCUMENTS

| | | | |
|---|---|---|---|
| 5,089,455 A | 2/1992 | Ketcham et al. ............ 501/104 |
| 5,273,837 A | 12/1993 | Aitken et al. .................. 429/30 |
| 5,395,704 A | 3/1995 | Barnett et al. ................. 429/30 |
| 5,543,239 A | 8/1996 | Virkar et al. ............. 429/40 X |
| 6,004,688 A | 12/1999 | Goodenough et al. ........ 429/33 |
| 6,004,696 A | 12/1999 | Barnett et al. ............ 429/40 X |
| 6,051,329 A | 4/2000 | Fasano et al. ................. 429/30 |
| 6,180,277 B1 | 1/2001 | Wilkenhöner et al. ......... 429/44 |
| 6,319,626 B1 * | 11/2001 | Wallin et al. .................. 429/45 |

FOREIGN PATENT DOCUMENTS

JP 03-081959 4/1991 ............ H01M/4/86

OTHER PUBLICATIONS

"High–Temperature Fuel Cells Part 2: The Solid Oxide Cell," Chemtech, 21:120–126 (1991).

* cited by examiner

Primary Examiner—Stephen Kalafut
(74) Attorney, Agent, or Firm—Kees van der Sterre

(57) ABSTRACT

The present invention relates to electrode/electrolyte assemblies for solid oxide fuel cells (SOFCs) comprising a thin electrolyte sheet interposed between opposite electrodes, and wherein the positive air electrode (cathode) and negative fuel electrode (anode) are composed of similar electronically conductive metal phases and stabilizing ceramic phases, and wherein the anode exhibits both good oxidation resistance and good catalytic activity toward fuel oxidation.

11 Claims, 2 Drawing Sheets

SOLID OXIDE FUEL CELLS WITH SYMMETRIC COMPOSITE ELECTRODES

This application claims the benefit of U.S. Provisional Application Ser. No. 60/205,353, filed May 18, 2000, entitled "Solid Oxide Fuel Cells with Symmetric Composite Electrode", by Badding et al.

BACKGROUND OF THE INVENTION

The present invention relates to an apparatus, such as a solid electrolyte fuel cell, which includes opposing, symmetric, composite electrodes including a conductive metal phase and a ceramic phase and a method of making such an apparatus.

The use of solid electrolyte materials for fuel cells and oxygen pumps has been the subject of a considerable amount of research for many years. The typical essential components of a solid oxide fuel cell ("SOFC") include a dense, oxygen-ion-conducting electrolyte sandwiched between porous, conducting metal, cermet, or ceramic electrodes. Electrical current is generated in such cells by the oxidation, at the anode, of a fuel material, such as hydrogen, which reacts with oxygen ions conducted through the electrolyte from the cathode.

Practical power generation units will typically include multiple fuel cells of such configuration interconnected in series or parallel with electronically conductive ceramic, cermet, or metal interconnect materials. At the present time, the materials of choice for such devices include yttria-($Y_2O_3$) stabilized zirconia ($ZrO_2$) for the electrolyte, nickel-$ZrO_2$ cermet for the anode material, strontium-doped lanthanum manganite ($LaMnO_3$) for the cathode, and metals, especially Cr/Fe alloys and Ni alloys, intermetallics, and Sr or Ba doped $LaCrO_3$, for interconnect structures. Alternative oxygen ion conductors are known. At sufficient temperatures (e.g., 600° C. or above), zirconia electrolytes can exhibit good ionic conductivity but low electronic conductivity.

Several different designs for solid oxide fuel cells have been developed, including, for example, a supported tubular design, a segmented cell-in-series design, a monolithic design, and a flat plate design. All of these designs are documented in the literature, with one recent description in Minh, "High-Temperature Fuel Cells Part 2: The Solid Oxide Cell," *Chemtech.*, 21:120–126 (1991).

A number of planar designs have been described which make use of free-standing electrolyte membranes. A cell is formed by applying electrodes to a membrane and consists of the electrolyte sheet and the applied electrodes. Typically these cells are then stacked and connected in series to build voltage. Monolithic designs, which characteristically have a multi-celled or "honeycomb" type of structure, offer the advantages of high cell density and high oxygen conductivity. The cells are defined by combinations of corrugated sheets and flat sheets incorporating the various electrode, conductive interconnect, and electrolyte layers, with typical cell spacings of 1–2 mm and electrolyte thicknesses of 25–100 microns.

U.S. Pat. No. 5,273,837 to Aitken et al. describes sintered electrolyte compositions in thin sheet form for thermal shock resistant fuel cells. It describes an improved method for making a compliant electrolyte structure wherein a precursor sheet, containing powdered ceramic and binder, is pre-sintered to provide a thin flexible sintered polycrystalline electrolyte sheet. Additional components of the fuel cell circuit are bonded onto that pre-sintered sheet including metal, ceramic, or cermet current conductors bonded directly to the sheet as also described in U.S. Pat. No. 5,089,455 to Ketcham et al. Advantages of the thin flexible sintered electrolyte structure include exceptional flexibility and robustness in the sintered state.

One requirement of fuel cell designs incorporating flexible ceramic and metallic layers is that of maintaining good thermal compatibility among the various electrolyte and electrode materials employed. For example, the use of a cathode material having a significantly higher thermal expansion coefficient than the anode introduces bending stresses or warpage in flexible fuel cell assemblies. While such bending can be tolerated without structural breakage if the electrolyte structure is thin, the need to accommodate the resulting shape distortions places limits on cell spacings and other aspects of geometric cell design.

Silver and its alloys are among the best electrical conductors known. Further, silver is both oxygen permeable and an excellent electrocatalyst for oxygen reduction. Therefore, silver has been used as a component in fuel cell cathodes despite its relatively high volatility at conventional fuel cell operating temperatures (800° C. and above).

U.S. Pat. No. 5,395,704 to Barnett, for example, discloses a thin film, nickel-mesh supported fuel cell including a silver/yttria-doped zirconia cermet cathode. However, silver has not been employed to any degree as an anode material due to its relatively poor catalytic performance towards fuel oxidation in comparison with standard nickel-containing anode compositions.

The present invention is directed to providing an improved fuel cell construction, applicable to any of the above fuel cell designs, which avoids many of the difficulties of fuel cell manufacture while providing a cell of improved physical, thermal, and electrical properties. In particular, the present invention is directed to high performance electrodes for intermediate-temperature solid oxide fuel cells.

SUMMARY OF THE INVENTION

The present invention relates to devices such as electrode/electrolyte assemblies for fuel cells which include a positive air electrode or cathode, a negative fuel electrode or anode, and a ceramic electrolyte structure interposed between and supporting the positive air electrode and the negative fuel electrode. The positive and negative electrodes are symmetric in that they are composite electrodes of similar base composition, with similar physical and thermal properties. They both comprise a conductive metal phase, typically a silver alloy, and a ceramic phase for improved electrode stability at high temperatures.

In order to develop good fuel oxidation activity in the cell, the negative (fuel) electrode is provided with a catalyst addition to enhance the fuel oxidation activity of the silver-based electrode. The catalyst is added in a proportion at least effective to increase fuel oxidation activity but not to substantially change the physical properties of the electrode.

The present invention also relates to a solid oxide fuel cell which includes a plurality of such assemblies, each comprising a positive air electrode and a negative fuel electrode formed of a composite of a conductive silver-containing metal phase and a ceramic phase, the electrodes being disposed on and supported by a ceramic electrolyte structure interposed between the electrodes.

Another aspect of the present invention relates to a method of making an electrical device which involves providing a thin, flexible ceramic electrolyte substrate and applying on opposing sides of the electrolyte substrate in symmetrical fashion thin electrode layers including a conductive metal phase and a ceramic phase.

The use of appropriate ceramic components in the silver-containing electrodes of the present invention reduces electrode interface resistance and improves electrode durability. In particular, electrodes so comprised display exceptionally low ohmic and interfacial resistance for both the air side (cathode) and fuel side (anode). Moreover, fuel cell devices of the present invention show excellent tolerance towards leakage of fuel into the air chamber or air into the fuel chamber. Such leakage may be expected in practice due to the presence of pinholes through the electrolyte, or egress through seals.

The superior electrical conductivity of the composite silver alloy electrodes allows use of extremely thin electrodes, as a thickness of only a few microns is needed to achieve acceptable ohmic loss. Assemblies provided by combining thin, flexible self-supporting electrolyte sheets with thin silver alloy electrodes are quite flexible and hence extremely thermal shock tolerant.

Further, notwithstanding the flexible character of the electrolyte sheet, the thermal expansion match between the anode and cathode layers results in a stress field symmetry that produces a flat, composite assembly. In assemblies based on flexible electrolytes, thermal mismatch within a bi-layer electrode/electrolyte structure is manifested as warpage of the bi-layer body. However, in tri-layer structures (anode/electrode/cathode), if the anode and cathode have closely matched thermal expansion behavior, the stress field is symmetric and a flat body is maintained. Maintaining an overall planar electrode/electrolyte assembly is important for low cost fuel cell stack fabrication.

BRIEF DESCRIPTION OF THE DRAWINGS

The invention may be further understood by reference to the drawings wherein.

DETAILED DESCRIPTION OF THE INVENTION

Figure 1:
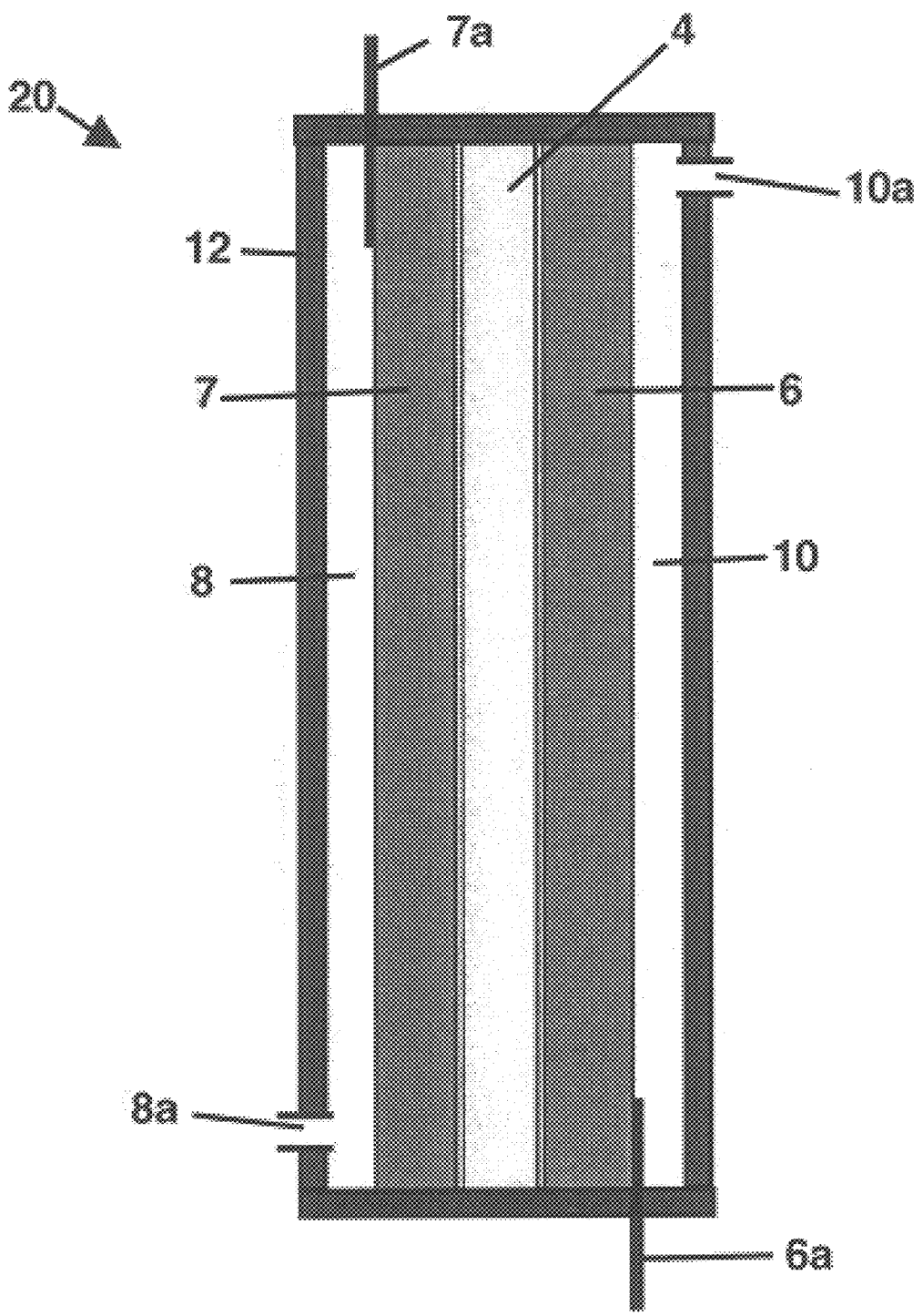
FIG. 1 is a schematic elevational view in cross-section of a single fuel cell provided in accordance with the invention.

The advantages of the electrode/electrolyte assemblies and fuel cells of the present invention arise principally from the use of the same base composite electrode material for both the positive air electrodes and the negative fuel electrodes in the assemblies. The conductive metal phase incorporated in the symmetric electrodes of the invention is a conductive refractory metal selected from the group consisting of silver and refractory silver alloys. In preferred embodiments, the conductive metal phase is a silver alloy selected from the group consisting of silver-palladium and silver-platinum alloys, although other silver alloys such as silver-gold, silver-nickel, or the like may alternatively be employed.

A serious challenge to achieving long-term durable electrode performance in silver-containing composite electrodes is microstructural instability due to silver mobility at operating temperatures over 600° C. For microstructural stability, silver-palladium is a better alternative than silver because it is more refractory, yet still economical. Melting point data for the silver-palladium system indicate that substantial increases in melting temperature are afforded by as little as a 10% (weight) Pd addition to the silver base. The higher melting temperature of the alloy allows higher processing and cell operating temperatures than allowed by silver alone.

For both silver and silver alloys such as silver-palladium, the microstructural stability of electrodes based on these metals is improved by inclusion of a ceramic phase to inhibit grain growth. The degree to which the ceramic component stabilizes the electrode microstructure depends in part on the degree to which the metal phase wets the ceramic phase; better results are seen with silver-palladium alloy relative to silver alone, probably due to the greater oxophilicity of palladium compared to silver.

Another benefit of palladium additions to the silver metal phase of the electrodes of the present assemblies is a reduction in thermal expansion mismatch between the metal in the electrode and the ceramic electrolytes of the presently preferred composition. Adding palladium (thermal expansion of about 13 ppm/° C.) to silver (thermal expansion of about 25 ppm/° C.) allows the resulting alloy to more closely match the thermal expansion coefficient low expansion ceramic phases such as 3% yttria-stabilized zirconia.

The ceramic phase to be combined with the metal phase in these composite electrodes is a polycrystalline ceramic. Useful polycrystalline ceramics include alumina, certain metal bismuthates, zirconia, stabilized zirconia, partially stabilized zirconia, hafnia, stabilized hafnia, partially stabilized hafnia, and mixtures of these alone or with additional oxides selected from the group consisting of the oxides of cerium, bismuth, gadolinium, and germanium.

Preferred ceramic phase materials include alumina fibers as well as the partially stabilized zirconias, stabilized zirconias, and metal bismuthates. The zirconias are stabilized with one or more oxides of elements selected from the group consisting of Y, Ce, Ca, Mg, Sc, Nd, Sm, Eu, Gd, Tb, Dy, Ho, Er, Tm, Yb, Lu, In, Ti, Sn, Nb, Ta, Mo, and W, and the bismuthates are oxide compounds of bismuth and one or more of these same elements. A particular example of a useful metal bismuthate is $DyBiO_3$.

Principal functions of the ceramic phase component in these electrodes are to reduce high temperature grain growth of the metal to improve microstructural stability, and to improve bonding to underlying interface or electrolyte surfaces.

Notwithstanding the effectiveness of these additions in improving the thermal stability of the electrodes, some changes in electrode grain structure will still occur in normal use. For example, a coarsening in the grain structure of the fuel side electrode as compared to the oxidant side electrode has been observed. However, with the use of appropriate ceramic additives these structural changes are not of a nature or magnitude that substantially upset the balance in thermal expansion between the opposing electrodes of these cells.

As previously suggested, composite electrodes formed only of silver or silver-palladium alloys in combination with ceramic grain-growth inhibitors do not exhibit suitable fuel oxidation activity when employed as anodes (negative fuel electrodes) in fuel cells operating at useful power-generating temperatures. This is because of the relative inactivity of silver as a catalyst for fuel oxidation. What is therefore required is an anode having good oxidation performance that matches the thermal and physical properties of silver-ceramic composite electrodes.

The anode materials used in accordance with the present invention are silver-ceramic composites similar in composition and properties to the composites used to form the cathodes, but modified to achieve high fuel oxidation activity. The infiltration of composite electrode layers with relatively small catalyst additions, generally of metallic and preferably of nickel composition, can significantly improve electrode hydrogen dissociation efficiency without significantly modifying the physical properties of the electrode.

The stability of silver alloys under both oxidizing and reducing conditions provides significant durability and service life advantages. Since electrodes of this composition are tolerant to mixtures of fuel and air, air leakage into the fuel side of the cells does not lead to catastrophic cell deactivation as it may from the oxidation of conventional nickel metal anodes. The problem of anodic carbon deposition posed by some fuels can easily be solved in these cells simply by exposing the silver alloy anodes to an oxidizing environment; further, rapid cell heatup from a cold start condition can be achieved without electrode damage simply through the harmless in situ combustion of air-fuel mixtures directly within the cells.

The proportion of conductive silver alloy component interspersed with ceramic components in the electrodes of the invention is not critical but will depend to some degree on the particular cell design selected, and on the nature of the provisions made for current collection from within the cell. In general, the use of higher fractions of metal decrease the ohmic resistance of the electrodes, simplifying current collection while reducing required electrode thickness and increasing electrolyte/electrode flexibility. On the other hand, insufficient proportions of ceramic constituents reduce the thermal durability of the electrodes. Typically, the electrode compositions will comprise about 50–99% by weight of silver or silver alloy and 1–50% by weight of dispersed ceramic powder.

As is well known, the electrode ohmic resistance is determined by the resistivity of the electrode, by its thickness, and by the length of the current path through the electrode. The resistivity of the electrode material limits the useful current path length. It is preferred that the electrode ohmic resistance be no greater than 0.4 ohm-cm$^2$, more preferred that it be less than 0.2 ohm-cm$^2$, and most preferred that it be less than 0.1 ohm-cm$^2$.

For metal electrodes, such as silver, palladium, platinum, and gold, the resistivity of the metal is on the order of $10^{-5}$ to $10^{-6}$ ohm-cm and the electrode thickness can be reduced to between 0.1 and 50 microns, for example between 1 and 20 microns, without sacrificing performance. Electrodes less than around 20 microns in thickness are preferred for minimizing material usage and enhancing flexibility and thermal shock resistance.

The need to provide very low ohmic resistance in the fuel cell electrodes of the present invention may be somewhat reduced though the use of current collecting grids positioned within the cell assemblies in contact with the electrodes. For a given electrode material and thickness, the use of collection grids reduces cell resistance by reducing the length of current paths through the electrode material.

FIG. 1 of the drawing schematically illustrates the elements of a solid electrolyte fuel cell of the present invention in the form of an elevational cross-section of a single fuel cell unit. In the partial elevational view of FIG. 1, fuel cell 20 includes an enclosure 12 within which is disposed an electrolyte sheet 4 having silver-palladium-based electrodes 6 and 7 attached thereto. The anode of the fuel cell (electrode 6) is open to access by fuel present in fuel reservoir 10 of the cell, while the cathode (electrode 7) is open to oxygen in oxygen or air reservoir 8. Air and fuel may be supplied to the cell via ports 8a and 10a, respectively, while electrical leads 6a and 7a provide pathways for electrical current passing to and from electrodes 6 and 7. The electrolyte/electrode assembly (4, 6, 7) is effective to physically separate the air and fuel in reservoirs 8 and 10, while electrolyte 4 allows oxygen ion conduction from the air to the fuel reservoir but restricts electronic conduction therebetween.

While the composition of the electrolyte layers in is the fuel cells of the invention is not critical, electrolytes of conventionally preferred oxygen-ion conductive ceramics such as stabilized or partially stabilized zirconia or hafnia are typically employed. Examples of suitable materials are polycrystalline ceramics selected from the group consisting of stabilized zirconia, partially stabilized zirconia, stabilized hafnia, partially stabilized hafnia, mixtures of zirconia and hafnia, ceria with zirconia, bismuth with zirconia, gadolinium, germanium, and mixtures thereof.

The preferred electrolyte layers are flexible ceramic sheets or films formed of a polycrystalline ceramic selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, and W and mixtures thereof.

The electrolyte resistance depends on material properties and geometry and is proportional to the thickness of the electrolyte. In order to operate a fuel cell at less than 850° C., 800° C., or more preferably, less than 725° C., the electrolyte must be as thin as is practical. Using a thin flexible electrolyte, devices operating between 600° C. and 700° C. can be envisioned.

In preferred embodiments, the electrolyte layers in the electrode/electrolyte assemblies of the present invention are below 45 microns in thickness, preferably below 30 microns in thickness, and most preferably 5–20 microns in thickness. The use of thin flexible polycrystalline ceramic electrolytes offers enhanced thermal shock resistance and electrochemical performance, and provides a durable free-standing electrolyte layer to which the electrodes may easily be applied.

The electrodes of the invention may be applied directly to smooth opposing surfaces of the thin flexible electrolytes, or they may be applied to electrolyte surfaces that are first provided with structurally stabilizing or electrically conducting interface layers. These interface layers can reduce interfacial resistance between the electrodes and electrolyte and/or can improve the adherence of the electrodes to the electrolyte.

One type of supplemental interface layer, which forms no part of the present invention, is described and claimed in the co-pending, commonly assigned application of M. Badding et al. entitled "Roughened Electrolyte Interface Layer For Solid Oxide Fuel Cells", filed concurrently herewith. Applied by tape casting as hereinafter more fully described, such interface layers typically have compositions matching or similar to the flexible electrolytes. Examples of preferred interface layer compositions are those consisting essentially of stabilized zirconia, partially stabilized zirconia, stabilized hafnia, partially stabilized hafnia, mixtures of zirconia and hafnia, ceria with zirconia, bismuth with zirconia, gadolinium, and germanium. Most preferred are stabilized and partially stabilized zirconia. These include partially stabilized zirconia or stabilized zirconia, either being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, and W and mixtures thereof.

Other effective interface layers include thin layers or coatings of known or conventional electro-ceramic materials. Examples of these materials include nickel cermets such as nickel-$ZrO_2$ cermet and strontium-doped lanthanum manganite, the nickel cermet typically being applied to the anode side and the manganite to the cathode side of the electrolyte. However, while these and other anodic or cathodic electro-ceramic materials may be successfully employed as interface layers in symmetric fuel cell assemblies, maintaining balanced physical properties in these assemblies requires that the thicknesses of the interface layers comprise only a minor portion (less than 50% total) of the combined thickness of each interface/electrode layer combination. The preferred thicknesses of these interface layers, if present, is thus in the range of about 3–6 microns.

As in conventional fuel cells, the electrode/electrolyte structures of the invention will typically be provided with additional fuel cell components such as metallic, ceramic, or cermet current conductors and electric leads. These will be permanently attached to the electrode surfaces to provide bonded combinations which will generally include at least one current conductor and at least one electrode (cathode and/or anode), with the electrode in electrical contact with both the current conductor and electrolyte structure. These bonded structures may optionally be provided with oxide overlayers for additional physical or chemical protection.

It is preferred that the electrode/coated electrolyte/electrode tri-layer retain some flexibility. For that purpose, it is desirable that the electrode/electrolyte assemblies provided possess a total thickness not exceeding about 150 microns. The thin electrolytes produce lower resistive losses, enhanced mechanical properties, and better utilization of raw materials.

The present invention also relates to a solid oxide fuel cell design including multiple (two or more) cell fuel cells, wherein at least two cell fuel cells are combined in an alternating fuel/air manifold wherein similar electrodes of adjacent multiple cell fuel cells face each other under conditions effective to form regions of air or fuel without additional gas separation or interconnection layers. The cells may then be interconnected in series or in parallel as the demands of the particular application may require.

Another aspect of the present invention is a method of making an electrode/electrolyte assembly comprising providing an electrolyte substrate and applying on opposing sides of the electrolyte substrate an electrode layer including a conductive metal phase and a ceramic phase. Optionally, fuel cell fabrication can include providing a roughened interfacial layer on the electrolyte prior to depositing the electrode thereon, as hereinafter more fully described.

The electrodes may be applied to the electrolyte using conventional methods, and thereafter fired if needed to develop electrode properties and/or to achieve an intimate bond to the electrolyte. The method of application can include any known in the art including, but not limited to, screen printing, transfer printing, vapor deposition, electroless plating, and the like. The electrodes may be applied in a single step or may require multiple steps using one or more methods to form the desired microstructure and composition. Current collecting grids, cell interconnects, power leads and the like are then attached to the fuel cell.

The invention may be further understood by reference to the examples, which are intended to be illustrative rather than limiting.

EXAMPLE 1

Electrode-Electrolyte Assembly

An electrolyte sheet for an electrode/electrolyte element useful for fuel cell fabrication is first provided. That electrolyte consists of a strong flexible sheet of sintered zirconia—3 mole % yttria ceramic, the sheet having a thickness of about 20 microns and being about 4 cm by 8 cm in size.

For this example, roughened surfaces are provided on this sheet to improve adhesion and reduce electrolyte/electrode interfacial resistance for the electrodes subsequently to be applied. The roughened surfaces are provided by applying rough nano-crystalline surface layers to opposing surfaces of the electrolyte. Application is carried out by tape casting a ceramic slip onto each of the opposing surfaces of the sheet, followed by drying and then firing.

The ceramic slip used to apply the surface layers is a fluid suspension of yttria-partially stabilized zirconia in an alcohol-based vehicle containing a plasticizer and powder binder. The slip is prepared by milling, triple settling with decantation, flocculation, and final dilution of a mixture of 100 g of TZ-3Y zirconia powder (Tosoh Corporation, Tokyo, Japan) in 50 g of an ethanol vehicle containing small additions of butanol, propylene glycol, water, and a dispersant.

Flocculation of the supernatant slip after final settling is achieved by adding 2 parts by weight of an ethanol-glacial acetic acid flocculant to the slip for each 100 parts by weight of remaining (suspended) zirconia. Flocculation is followed by the addition of 3.5 parts of a dibutyl phthalate plasticizer and 6 parts of a polyvinyl butyral powder binder to the flocculated slip, with further mixing over a period of several hours.

A 3:1 dilution of this slip is next carried out by means of a liquid addition of additional vehicle, plasticizer and binder in proportions substantially equivalent to those of the undiluted slip. The diluted slip is then tape-cast onto a first surface of the electrolyte sheet at a casting blade clearance of about 12 $\mu$m, and dried at 70° C. After coating the reverse side of the electrolyte sheet in the same manner, the electrolyte with dried surface coatings is fired in air to 1300° C. to sinter and bond the coatings to the electrolyte surfaces.

Symmetric palladium-silver alloy electrodes 2.5 cm by 1 cm in area are next printed on opposite sides of the electrolyte sheet. These electrodes are applied by screen printing from a printing mixture comprising palladium-silver alloy powder and a ceramic powder stabilizer mixed with a conventional screen printing vehicle.

The vehicle contains TEXANOL® solvent from the Eastman Chemical Co. Kingsport, Tenn., ethyl cellulose T100 polymer from Hercules Aqualon, Hercules Incorporated, Houston, Tex., BYK-354 leveling agent from BYK-Chemie, Wesel, Germany, Anti-Terra 202 dispersant also from BYK-Chemie, and Hypermer LP4 dispersant from ICI Americas, Inc., Wilmington, Del. The solids component of the screen printing mixture consists of an alloy/ceramic powder mixture containing 53% by volume of a 90 wt % silver/10 wt % palladium alloy powder available from Englehard Corporation, Iselin, N.J., and 47% by volume of 3Y-$ZrO_2$ powder from the Tosoh Corporation, Tokyo, Japan.

The electrode coatings are applied to the electrolyte surfaces by screening to a thickness sufficient to provide consolidated electrodes approximately 10 um thick on opposite sides of the electrolyte after firing. After screening, the electrolyte sheet with deposited screen coatings is fired to 900° C. to consolidate and bond the coatings to the electrolyte. When tested for electrical impedance this assembly exhibits a real interface resistance of less than 0.3 ohm/$cm^2$ for the two electrode interfaces, corresponding to an interface resistance of 0.15 ohm/$cm^2$ for at each single electrode/electrolyte interface.

The electrode which is to perform the function of an anode in a fuel cell employing this assembly is next treated to enhance its activity for fuel oxidation. For this purpose, the anode is catalyzed with nickel by repeated infiltration with a 0.5 M solution of nickel nitrate. The solution is applied by swabbing on to the anode surface followed by drying at 350 C, this procedure being repeated ten times to achieve the desired nickel loading of the anode. The resulting composite (nickel)anode/electrolyte/cathode assembly is thin and flexible, and substantially flat over a broad range of temperatures due to the symmetric physical properties of the opposing electrodes.

Figure 2:
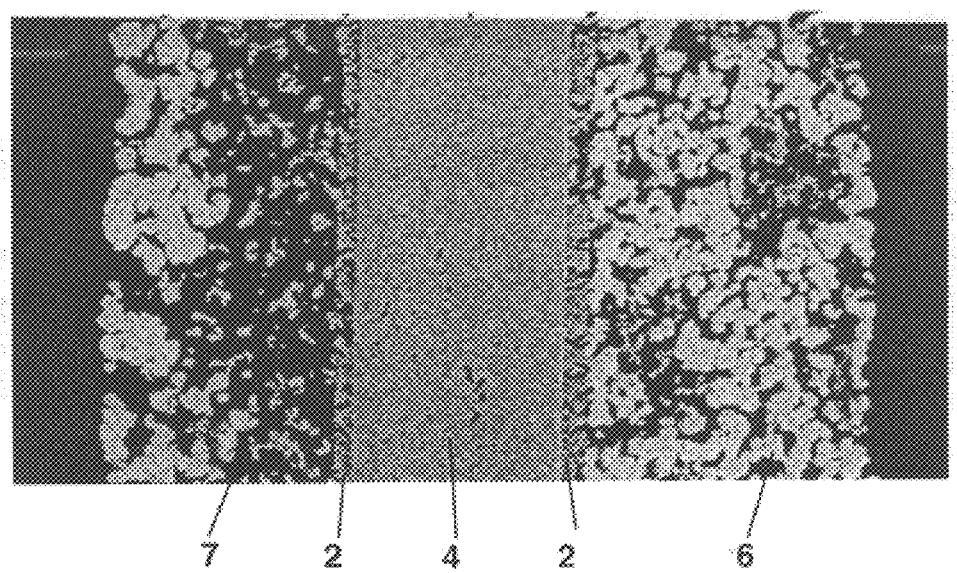
FIG. 2 is an electron photomicrograph of a symmetric electrode/electrolyte assembly provided in accordance with the invention.

FIG. 2 of the drawing consists of an electron photomicrograph of a cross-section of an electrode/electrolyte assembly provided substantially in accordance with the foregoing example. In that photomicrograph, electrolyte 4 supports and separates cathode 7 on one side of the electrolyte from anode 6 on the other side of the electrolyte. Optional roughened interface layers 2 applied to each of the surfaces of electrolyte 4 to reduce cell interfacial resistance can also be observed.

EXAMPLE 2

Solid Oxide Fuel Cell Assembly

An electrode/electrolyte composite prepared substantially as described in Example 1 above is incorporated into a simple fuel cell assembly for evaluating fuel cell performance. Silver wire leads are first attached to the electrodes using silver paste and a simple manifold is then constructed. A fuel reservoir is formed by edge-sealing the anode side of the electrolyte/electrode composite to a stainless steel backing sheet to form an envelope having fuel inlet and outlet ports at opposing ends. A fuel gas feed tube is then sealed into an inlet port in the envelope. Edge-sealing of the envelope and inlet tube to prevent fuel leakage is by means of a stainless steel ceramic composite paste (Duralco 230 paste from the Cotronics Corporation, Brooklyn, N.Y.

Alumina felt is next inserted into the fuel reservoir outlet to act as an exhaust restriction and the fuel gas feed tube is connected to a hydrogen fuel gas source. The fuel cell assembly is then inserted into a furnace with the furnace chamber forming the air or oxidant reservoir of the fuel cell which is in contact with the exposed cathode side of the electrolyte/electrode assembly.

The furnace is next heated while hydrogen fuel is supplied to the anode via the feed tube to heat the cell to operating temperature and set up a convective flow of furnace air across the cathode. A thermocouple is cemented directly to the cathode side of the electrolyte to provide an accurate indication of fuel cell operating temperature.

Figure 3:
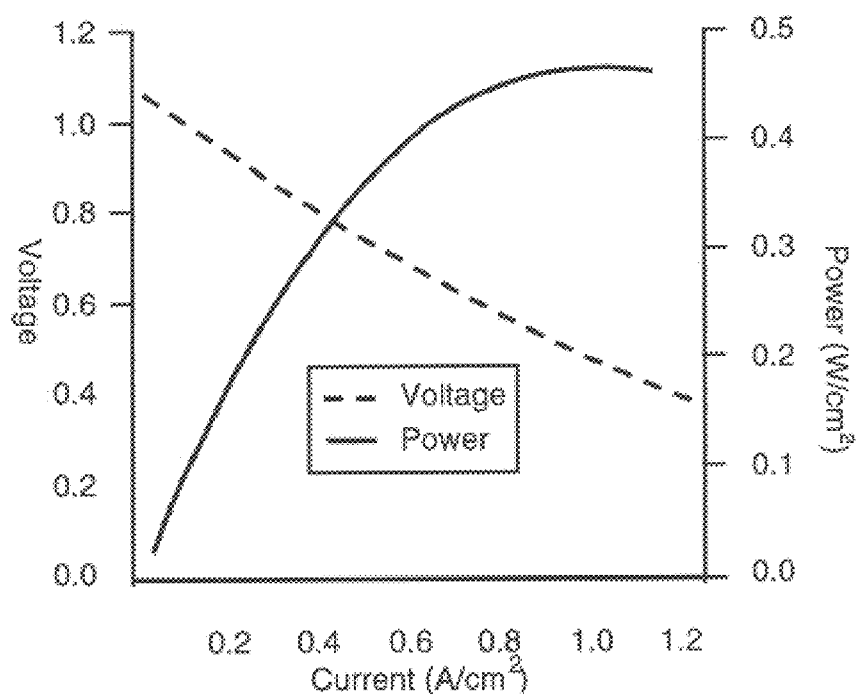
FIG. 3 is a plot of fuel cell power output for a fuel cell provided according to the invention.

FIG. 3 of the drawing graphs the performance of the fuel cell configured in accordance with this Example over a range of operating temperatures that includes the temperature of maximum cell power output. With pure hydrogen as the fuel, a maximum cell power density of about 0.46 W/cm$^2$ is observed at an output current near 1.0 A/cm$^2$ with a cell operating temperature of 725° C.

EXAMPLE 3

Electrode Oxidation Stability

A principal advantage of the silver alloy based electrodes of the invention is the high resistance of the anode compositions to oxidation damage. This resistance enables the anode to be oxidatively treated to restore full power output after a period of operation during which anode performance has gradually deteriorated due to the accumulation of carbon deposits or the like.

To measure this performance, a fuel cell of a design similar to that of the fuel cell of Example 3 is constructed and tested in a furnace on a forming gas fuel (6% H$_2$ in nitrogen) to establish an initial peak operating output of 0.2 W/cm$^2$ for the cell. The cell is thereafter run galvanostatically over a period of several hours at about 0.1 A/cm$^2$ to cause coking (carbon accumulation) on the anode. The level of coking is sufficient to reduce the peak operating output of the cell to about 0.176 W/cm$^2$.

Following this treatment, the cell is exposed to an oxygen-containing decoking atmosphere at a temperature and for a time sufficient to remove carbon deposits from the anode. The cell is then re-tested for power output using forming gas fuel, and it is found the initial peak power level of 0.2 W/cm$^2$ is again attained.

Although the invention has been described in detail for the purpose of illustration, it is understood that such detail is solely for that purpose, and variations can be made therein by those skilled in the art without departing from the spirit and scope of the invention which is defined by the following claims.

We claim:

1. An electrode/electrolyte assembly comprising:
   a free-standing, thin ceramic electrolyte sheet;
   a positive air electrode disposed on a first surface of the sheet; and
   a negative fuel electrode disposed opposite the air electrode on a second surface of the sheet;
   wherein both the positive and negative electrodes comprise a metallic silver or silver alloy conductive metal phase and both the positive and negative electrodes include a polycrystalline ceramic phase.

2. An assembly in accordance with claim 1 wherein the conductive metal phase is a silver alloy selected from the group consisting of silver-palladium and silver-platinum alloys.

3. An assembly in accordance with claim 2 wherein at least one of the first and second surfaces of the ceramic electrolyte sheet incorporates a stabilizing or electrically conducting interface layer.

4. An assembly in accordance with claim 3 wherein the interface layer is selected from the group consisting of stabilized zirconia, nickel cermets, and strontium-doped lanthanum manganite.

5. A solid oxide fuel cell incorporating an electrode/electrolyte assembly comprising:
   a free-standing, thin ceramic electrolyte sheet of from about 5 microns to about 45 microns in thickness;
   a positive air electrode disposed on a first surface of the sheet; and
   a negative fuel electrode disposed opposite the air electrode on a second surface of the sheet;
   wherein both the positive and negative electrodes comprise a conductive silver or silver alloy metal phase and both the positive and negative electrodes comprise a polycrystalline ceramic phase.

6. A fuel cell in accordance with claim 5 wherein the positive or negative electrode includes a polycrystalline ceramic phase selected from the group consisting of alumina, metal bismuthates, zircon zirconia, partially stabilized zirconia, hafnia, stabilized hafnia, partially stabilized hafnia, mixtures of the foregoing, and mixtures of the foregoing with additional oxides selected from the group consisting of the oxides of cerium, bismuth, gadolinium, and germanium.

7. A fuel cell according to claim/wherein the polycrystalline ceramic phase has a composition selected from the group consisting of partially stabilized zirconia or stabilized zirconia, the partially stabilized or stabilized zirconia being doped with a dopant selected from the group consisting of the oxides of Y, Ce, Ca, Mg, Sc, Nd, Sm, Eu, Gd, Tb, Dy, Ho, Er, Tm, Yb, Lu, In, Ti, Sn, Nb, Ta, Mo, and W and mixtures thereof.

8. A fuel cell according to claim 5 wherein the negative fuel electrode is infiltrated with an oxidation catalyst.

9. A fuel cell according to claim 8 wherein the oxidation catalyst is nickel.

10. A fuel cell according to claim 5 wherein at least one of the first and second surfaces of the ceramic electrolyte sheet incorporates a stabilizing or electrically conducting interface layer.

11. A fuel cell according to claim 10 wherein the interface layer has a composition selected from the group consisting of stabilized zirconia, nickel cermets, and strontium-doped lanthanum manganite.

* * * * *

UNITED STATES PATENT AND TRADEMARK OFFICE
CERTIFICATE OF CORRECTION

PATENT NO.    : 6,630,267 B2  
DATED         : October 7, 2003  
INVENTOR(S)   : Badding et al.

It is certified that error appears in the above-identified patent and that said Letters Patent is hereby corrected as shown below:

<u>Column 10,</u>  
Line 65, "zircon zirconia," should be -- zirconia, stabilized zirconia, --.

<u>Column 11,</u>  
Line 4, "claim/wherein" should be -- claim 6 wherein --

Signed and Sealed this

Second Day of March, 2004

JON W. DUDAS  
*Acting Director of the United States Patent and Trademark Office*